(No Model.) 2 Sheets—Sheet 1.

J. COFFITS.
CORN PLANTER.

No. 535,941. Patented Mar. 19, 1895.

Attest.
Jos. Kulicel
C. W. Williams.

Inventor
John Coffits
By J. M. St. John.
Atty.

THE NORRIS PETERS CO., PHOTO-LITHO., WASHINGTON, D. C.

(No Model.) 2 Sheets—Sheet 2.
J. COFFITS.
CORN PLANTER.
No. 535,941. Patented Mar. 19, 1895.
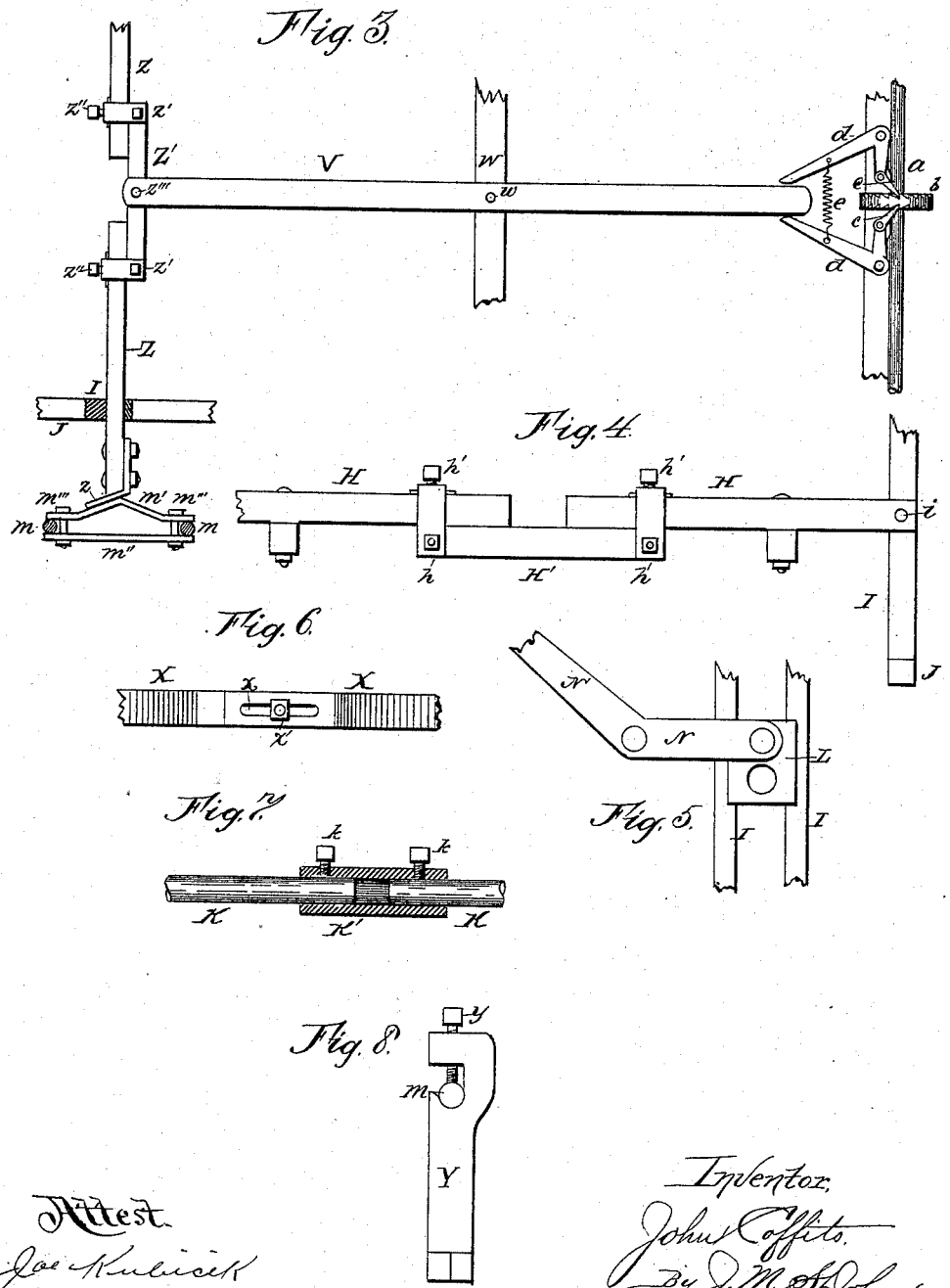

UNITED STATES PATENT OFFICE.

JOHN COFFITS, OF CEDAR RAPIDS, ASSIGNOR OF ONE-HALF TO E. F. BECKEL, OF ANAMOSA, IOWA.

CORN-PLANTER.

SPECIFICATION forming part of Letters Patent No. 535,941, dated March 19, 1895.

Application filed May 11, 1894. Serial No. 510,836. (No model.)

*To all whom it may concern:*

Be it known that I, JOHN COFFITS, a citizen of the United States, residing at Cedar Rapids, in the county of Linn and State of Iowa, have invented certain new and useful Improvements in Corn-Planters; and I do hereby declare the following to be a full, clear, and exact description of the invention, such as will enable others skilled in the art to which it appertains to make and use the same.

The object of this invention is to provide a corn-planter with means for automatically dropping the corn in suitable rows, and without the use of a check-row cord, or the preliminary cross-marking of the field.

The invention consists in the construction, combination and arrangement of parts, as hereinafter fully set forth and claimed.

Figure 1:
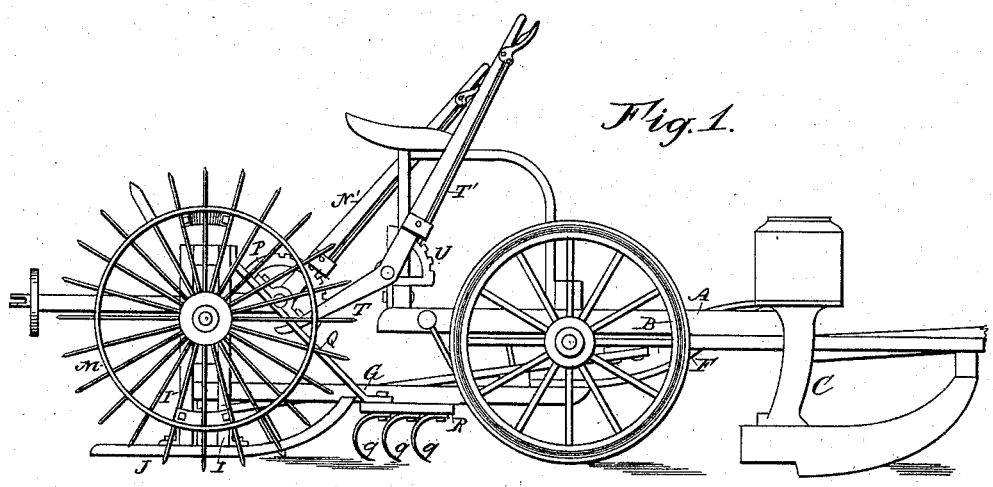
Figure 2:
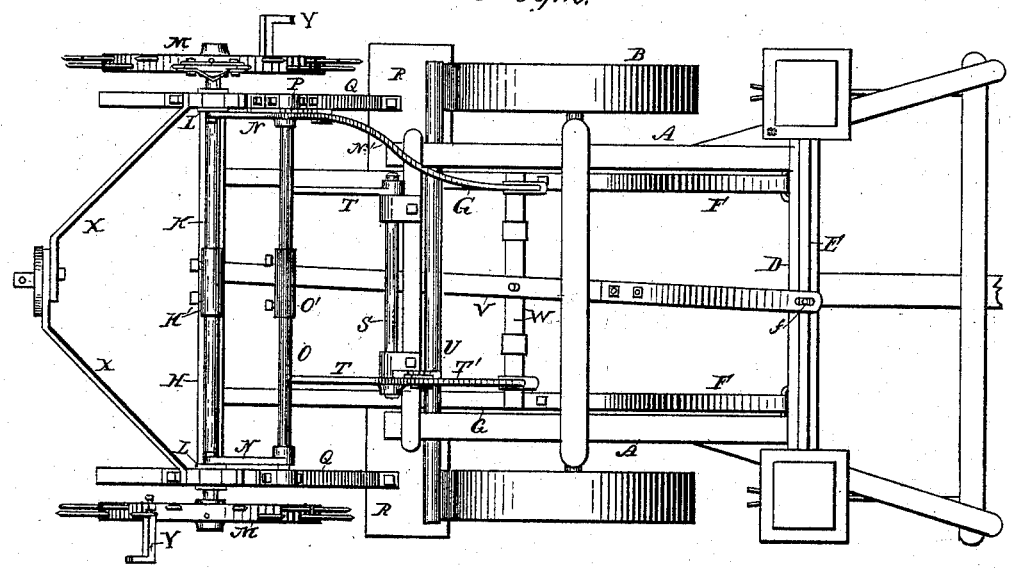

In the accompanying drawings, forming a part of this specification, Figure 1, Sheet 1, is a side elevation of mechanism embodying the invention, as applied to a corn-planter of familiar construction. Fig. 2 is a plan view of the same, with the driver's seat removed. Fig. 3, Sheet 2, is a fragmentary plan view, showing the detail of the dropper actuating mechanism, but with a suitable modification to admit of its application to a rotary feed instead of a reciprocating feed, as shown in Fig. 2. Fig. 4 is a fragmentary end elevation, showing means for adjusting the width of the machine to any desired width of planting. Fig. 5 is a fragmentary side elevation, showing detail of the spider-adjusting mechanism. Fig. 6 is a fragmentary elevation of the marker-supporting brackets at the rear end of the machine, showing means for adjusting them to suit the width of the machine. Fig. 7 is a fragmentary view, partly in section, showing means for adjusting the length of the spider axle. Fig. 8 is a bottom view of a marker to indicate the position of a hill already planted.

Similar letters of reference indicate corresponding parts.

The mechanism which forms the subject matter of this invention is intended to be attached to any of the planters now in use. For the purposes of this application, however, it has been considered sufficient to illustrate but one style of planter, having certain well known characteristics. In this the main frame is designated by the reference letter A. This is supported by the usual covering wheels B B. In front of these are the usual furrowing shoes and dropping mechanism C, having a suitable cross-beam D. E is a common reciprocating feed-bar. All of these parts being familiar, need not be further described.

Back of this organized planter is attached a spacing and feed-actuating device, by a pair of reaches or shafts F F suitably connecting with the cross-beam E, as by hooking into loops attached thereto. The backward portions of these reaches, G G, form a part of the frame for the spacing mechanism, connecting at the rear ends with cross-beams H H. These cross-beams at their outer ends are rigidly secured, as by bolts $i\,i$, to uprights, or standards I I, separated for the reception of boxes L L, and connecting at the lower ends with a pair of runners J J. In these boxes is mounted an axle K, which for the purpose of lengthwise adjustment is made in three parts, the parts K K to which the spiders M M are affixed, being held at their inner ends in a sleeve $K'$ by suitable set-screws $k\,k$.

The spiders, which serve as spacing wheels, and impart motion to the dropping mechanism, consist of hubs immovably fixed on the axle, a series of radiating spokes $m\,m$, and rims M through which the spokes pass, extending some distance beyond them. The outer ends of the spokes penetrate the ground such a distance as may be required, thus spacing the distance passed over by the planter. Each spider is provided with one or more cams $m'$, which may be simply angled plates as shown, secured to two of the spokes by bolts $m'''\ m'''$ and clamp-plates $m''$. These cams at each revolution of the spider come in contact with cams $z$ at the ends of a reciprocating bar Z. It is to be understood that the cams are mounted at diametrically opposite points on the respective spiders, and that the part of the bar Z shown broken in Fig. 3, if extended, would be supplied with a cam similar to that shown at the opposite end. The effect of this construction is of course to throw the bar first in one direction, and then in the other, according as the one or the other of the spider-cams passes it. This bar is also made adjustable lengthwise by being made of three parts, the terminal parts Z Z being mounted in stirrups z' z' attached to a central part Z', and held in position by set-screws z" z".

To the bar Z' is connected the end of a bar V, by a stud z'''. At some suitable point near the middle, this bar is mounted by a pivot w on a cross-beam W. The forward end of the bar V engages with the dropper slide, as by a stud f, shown in Fig. 2, or by intermediate mechanism, as hereinafter described, where the feed is not of the reciprocating type.

It will be observed that the spiders do not travel independently upon the ground, whereby they would be subject to variation in spacing by reason of inequalities in the surface or the nature of the soil, but are supported on the runners J J, the penetration of the extending spokes being thus kept uniform. These runners are placed directly behind a portion of the covering wheels, and thus find a comparatively hard and smooth path. To further aid in leveling the path for the runners a small harrow g g is placed between the covering wheels and the runners. This tends both to level the path for the runners, and also to loosen up the soil as packed down by the covering wheels, making it more easy for the corn to come up.

Such variation in the spacing as may be desired is effected by a change in the elevation of the spiders. This is accomplished in the following manner: In suitable boxes attached to the diagonal braces Q Q connecting the upper ends of the standards I I and the harrow-boards R R, is mounted a rock-shaft O, provided with a sleeve O' for adjustment, the same as the axle already described. To this rock-shaft is fixed a pair of arms N N, connecting at their rear ends pivotally with the upper portions of the boxes L L. To the shaft is also secured a hand-lever N', extending forwardly and upwardly to a point convenient to the driver. The position of the lever is regulated by a suitable notched quadrant P. When it is desired to plant a little more closely together, the spider is depressed, and vice-versa.

In turning around it is desirable that the entire spacing mechanism should be lifted clear of the ground. This is effected by another hand-lever T' mounted on a suitable quadrant U, and secured to a rock-shaft S mounted on the cross-beam at the rear end of the planter. This rock-shaft is provided with a pair of arms T T which extend backwardly and hook under some portion of the spacing mechanism, as the rock-shaft O. By pressing the lever downwardly the whole spacing machine is lifted clear of the ground. Normally the lever is thrown back far enough to be entirely disengaged from the mechanism behind, so that the same is free to move up and down a limited distance, according to the inequalities of the soil.

To indicate the location of the planted corn the spiders are provided each with one or more markers Y Y, according to the number of cams. The marker is an angled iron, in one extremity of which is a seat for one of the spokes of the spider, with a set-screw y for attachment thereto. The other end is pointed, and serves to make an indentation in the ground a short distance from the hill and directly opposite thereto.

The marker may be attached to any spoke of the spider, so as to coincide with the dropped corn in the forward movement of the planter, regardless of the distance between the dropper and the spacing mechanism.

In case it is desired to indicate the position of each hill on both sides of the machine, there should of course be twice as many markers as cams, since the cam on each spider drops a hill.

For convenience in mounting and operation the marker for the row, which serves as a guide to the driver, and which is ordinarily mounted at the rear of the planter frame, is transferred to the rear of the spacing mechanism. The marker itself, being of familiar construction, is not herein shown. The support consists of a pair of angled arms X X, secured to the standards I I at the outer ends, the inner ends overlapping and fastened together by a bolt or screw x'. A slot x allows the necessary adjustment hereinbefore referred to.

It is to be understood that the cross-beam W is adjustable lengthwise in the same manner as the cross-beam H.

In Fig. 3 is shown a device whereby rotary motion is transmitted to the dropper by the oscillating arm V. On the feed-shaft a is secured a double ratchet wheel b. Each side of this is mounted a bell-crank lever d, provided with a pawl c. The rearwardly extending arms of the bell-cranks lie each side of the oscillating bar V, and are connected by a coil spring e. As the bar oscillates the pawls serve to turn the ratchet, step by step, in a manner that will be readily understood.

Having thus described my invention, I claim—

1. In a corn-planter, the combination with seed-dropping and covering mechanism, substantially as described, of spacing wheels mounted back of the covering wheels, cams thereon adapted to engage with cams of a reciprocating bar, a reciprocating bar adapted to be moved alternately by said spacing-wheel cams, means substantially as described for transmitting said motion to the feeding mechanism, and auxiliary shoes or runners adjacent to said spacing-wheels, adapted to support them, substantially as and for the purpose set forth.

2. In a corn-planter, the combination with seed-dropping and covering mechanism, substantially as described, of a pair of spacing-wheels mounted directly behind the covering wheels, said wheels having spokes or spurs extending beyond the rims thereof, a pair of auxiliary runners adjacent to said spacing wheels, a harrow between each spacing-wheel and covering wheel, and mechanism adapted to transmit motion from the spacing wheels to the feed slide, substantially as and for the purposes set forth.

3. In a corn-planter, the combination with seed-dropping and covering mechanism, substantially as described, of a pair of auxiliary runners mounted behind the covering wheels, a pair of vertically adjustable spacing-spiders supported by said runners, and mechanism substantially as described for transmitting motion from said spiders to the feed slide, substantially as and for the purpose set forth.

4. In a corn-planter, the combination with the seed-dropping and covering mechanism, substantially as described, of a pair of auxiliary runners mounted behind the covering wheels, a pair of spacing-spiders turning concurrently and vertically adjustable on standards attached to said runners, a hand lever adapted to raise and lower said spiders with respect to the runners, and mechanism transmitting motion from the spiders to the feed slide, substantially as and for the purpose set forth.

5. In a corn-planter, the combination with the oscillating bar V, of the rotary feed-shaft $a$, ratchet $b$, pawls $c\ c$, arms $d\ d$ and connecting spring $e$, substantially as and for the purpose set forth.

In testimony whereof I affix my signature in presence of two witnesses.

JOHN COFFITS.

Witnesses:
    JOS. KUBICIK,
    JOE SOMERVILLE.